United States Patent
Dong et al.

(10) Patent No.: US 9,776,918 B2
(45) Date of Patent: Oct. 3, 2017

(54) LOW EFFLORESCENCE TILE GROUT COMPOSITION

(75) Inventors: Chengbin Dong, Shanghai (CN); Jonas L. Lu, Shanghai (CN)

(73) Assignee: Dow Global Technologies LLC, Midland, MI (US)

( * ) Notice: Subject to any disclaimer, the term of this patent is extended or adjusted under 35 U.S.C. 154(b) by 479 days.

(21) Appl. No.: 14/368,641

(22) PCT Filed: Dec. 29, 2011
(Under 37 CFR 1.47)

(86) PCT No.: PCT/CN2011/084901
§ 371 (c)(1),
(2), (4) Date: Jun. 25, 2014

(87) PCT Pub. No.: WO2013/097138
PCT Pub. Date: Jul. 4, 2013

(65) Prior Publication Data
US 2015/0113907 A1     Apr. 30, 2015

(51) Int. Cl.
*C04B 7/02*    (2006.01)
*C04B 14/10*   (2006.01)
*C04B 28/04*   (2006.01)
*C04B 7/32*    (2006.01)
*C04B 24/08*   (2006.01)
*E04F 15/02*   (2006.01)
*C04B 111/21*  (2006.01)
*C04B 111/00*  (2006.01)

(52) U.S. Cl.
CPC ............ *C04B 7/02* (2013.01); *C04B 7/32* (2013.01); *C04B 24/085* (2013.01); *C04B 28/04* (2013.01); *E04F 15/02016* (2013.01); *C04B 2111/00672* (2013.01); *C04B 2111/21* (2013.01)

(58) Field of Classification Search
CPC .......... C04B 7/02; C04B 24/085; C04B 7/32; C04B 28/04; C04B 2111/00672; C04B 2111/21; E04F 15/02016
USPC .............. 52/742.13; 106/691, 692, 638, 705
See application file for complete search history.

(56) References Cited

U.S. PATENT DOCUMENTS

| | | | |
|---|---|---|---|
| 4,983,220 A | 1/1991 | Mathieu | |
| 6,231,665 B1 | 5/2001 | Kerkar et al. | |
| 6,258,161 B1* | 7/2001 | Kerkar et al. | 106/808 |
| 7,803,225 B2 | 9/2010 | Zhang et al. | |
| 8,431,646 B2* | 4/2013 | Giessler-Blank et al. | 524/588 |
| 8,491,969 B2* | 7/2013 | Willimann et al. | 427/385.5 |
| 8,623,462 B2* | 1/2014 | Zapf et al. | 427/385.5 |
| 8,680,181 B2* | 3/2014 | Aberle et al. | 524/2 |
| 8,703,874 B2* | 4/2014 | Aberle et al. | 525/252 |
| 8,883,907 B2* | 11/2014 | Moraru et al. | 524/456 |
| 2009/0011207 A1* | 1/2009 | Dubey | 428/219 |
| 2009/0223416 A1 | 9/2009 | Aberle et al. | |
| 2010/0119851 A1* | 5/2010 | Giessler-Blank et al. | 428/447 |
| 2010/0326326 A1 | 12/2010 | Rigaud et al. | |
| 2011/0039984 A1* | 2/2011 | Buhler et al. | 524/5 |
| 2011/0104377 A1* | 5/2011 | Zapf et al. | 427/385.5 |
| 2011/0104378 A1* | 5/2011 | Willimann et al. | 427/385.5 |
| 2011/0203487 A1* | 8/2011 | Aberle et al. | 106/781 |
| 2011/0297049 A1* | 12/2011 | Zapf et al. | 106/803 |
| 2012/0031303 A1* | 2/2012 | Constantz et al. | 106/640 |
| 2012/0148806 A1* | 6/2012 | Dubey et al. | 428/193 |
| 2012/0309875 A1* | 12/2012 | Aberle et al. | 524/272 |
| 2012/0328788 A1* | 12/2012 | Willimann et al. | 427/393.5 |
| 2013/0085210 A1* | 4/2013 | Friedel et al. | 524/5 |
| 2013/0098271 A1* | 4/2013 | Eberwein et al. | 106/692 |
| 2013/0131220 A1* | 5/2013 | Zapf et al. | 524/5 |
| 2013/0203926 A1* | 8/2013 | Moraru et al. | 524/456 |
| 2013/0284069 A1* | 10/2013 | Dubey | 106/695 |
| 2013/0284070 A1* | 10/2013 | Dubey | 106/695 |
| 2014/0135428 A1* | 5/2014 | Klein et al. | 524/5 |

FOREIGN PATENT DOCUMENTS

| | | | |
|---|---|---|---|
| CN | 101475354 A | 7/2009 | |
| CN | 101628799 A | 1/2010 | |
| CN | 101874004 A | 10/2010 | |
| CN | 101913794 A | 12/2010 | |
| DE | 29701606 U1 | 3/1997 | |
| DE | 102004030121 A1 | 1/2006 | |
| DE | 102006038743 A1 | 2/2008 | |
| JP | 52027424 A | 3/1977 | |
| JP | 2263751 A | 10/1990 | |
| JP | 2000-203913 A | 7/2000 | |
| JP | 2000-272981 A | 10/2000 | |
| JP | 2001-172071 A | 6/2001 | |
| WO | WO 2008074711 A2 * | 6/2008 | ............ C04B 28/04 |

OTHER PUBLICATIONS

WO 2008074711 A2 Translation, Jun. 2008.*
Gai et al., "Preparation of ceramic tile cementing mortar for inhibition of crystalline bloom," New Building Materials, 2009, 2, Abstract only.
Zhang, "Research for reduction of efflorescence in dry-mix mortar," Beijing University of Technology, Master Thesis, 2008, Abstract only.
Wu et al., "Development of no visible efflorescence cementitious grout for tile," New Building Materials, 2011, 1, pp. 51-53 (partial translation).

* cited by examiner

*Primary Examiner* — Brent W Herring
(74) *Attorney, Agent, or Firm* — Andrew E. C. Merriam

(57) ABSTRACT

The present invention provides a dry mix of cement, sand, metakaolin in the amount of 5 wt % or less, based on total solids in the dry mix, and aluminum cement in a low amount (≤1 wt. %, based on total solids in the dry mix) useful as a tile grout, as well as uses thereof and to methods of using the same as a tile grout. The dry mix when made into a mortar exhibits excellent resistance to efflorescence as a tile grout.

10 Claims, No Drawings

LOW EFFLORESCENCE TILE GROUT COMPOSITION

The present invention relates to tile grout cement compositions comprising a dry mix of cement, sand, metakaolin and aluminum cements in a low amount (≤1 wt. %), as well as to uses thereof and to methods of using the same.

Tile grout is used to fill the spaces between tiles so as to complete the tile layer, prevent water permeation into the substrate and absorb the deformation stress of the tiles. There are mainly two types tile grout, cement containing or cement based tile grout and epoxy containing or epoxy based tile grout. Cement containing tile grout presently dominates the market because it provides water resistance at a relatively low cost. Cement containing tile grouts commonly exhibit efflorescence Efflorescence is a whitish deposit on the surface of the tile grout, having as its main components $CaCO_3$ and other chemicals such as $Na_2CO_3$, $K_2CO_3$, $CaSO_4$. The formation of efflorescence depends in grout on the presence of water soluble salts (especially $Ca^{2+}$), the presence of water and the presence of channels along which water can migrate to the surface of the grout. During hydration of the cement, water soluble chemicals such as $Ca(OH)_2$ are formed. During the drying of the grout, these water soluble chemicals migrate with water to the surface of grout and then react with the $CO_2$ or $SO_2$ in the air to form the respective carbonate or sulphate salt. While formed in all seasons, efflorescence is an especially serious problem in winter because of the slower hydration of a cement and the lower water solubility of chemicals at colder temperatures. Although not normally damaging to mortar strength, efflorescence poses an aesthetic problem.

While efflorescence problem cannot be entirely solved but methods to decrease it include replacing Portland cement with aluminum cement which contains much less $Ca(OH)_2$ than Portland cement. However, aluminum cement still contains other chemicals such as $Na_2(OH)_2$, $K_2(OH)_2$ which can also form white deposits on the surface of grout. In addition, white aluminum cement is very expensive. One could use a high reactive filler such as ultra fine silica fume and metakaolin. These fillers can react with the $Ca(OH)_2$ which is formed during the hydration process and thus decrease the formation of $CaCO_3$. Other additives such as deformer and hydrophobic agent may be included as well to form a close knit structure and decrease water absorption. The problem of this method is that at low temperatures the reactivity of filler decreases and cannot effectively decrease the efflorescence. One could also use an accelerator such as calcium formate to accelerate the strength development of cement; however, it is not effective because accelerators will bring more salt into mortar. Use of a redispersible powder such as ethylene/vinyl laurate/vinyl chloride powder can give a hydrophobic effect to decrease water absorption. This method has limited effect. In addition, too much redispersible powder can retard the cement hydration and cause more serious efflorescence. Finally, recently developed additives such as ERA200 (Elotex Ag, Sempach Station, CH) are polymers with which a hydrophobic agent should be combined to achieve lower water absorption at a very high cost.

Recently, CN101913794A, to Changzhou Construction Science Academy Co. Ltd., discloses a cement plaster restraining saltpetering additive which is capable of reducing efflorescence in cement plaster, comprising 75-90% of high reactivity metakaolin, 3-5% of resin (carboxylic resin or phosphate resin) and 10-15% of other additives (water soluble defoamer, PCE super-plasticizing agent and an organic silicon hydrophobic agent). However, the organic silicon hydrophobic agent is very expensive, the plaster compositions comprising the additive dry slowly at low temperatures and decrease the effectiveness of the tile grout.

The present inventors have sought to solve the problem of providing a tile grout composition which effectively reduces efflorescence at a reasonably low cost.

STATEMENT OF THE INVENTION

1. In accordance with the present invention, low efflorescence tile grout compositions comprise a dry mix of Portland cement, sand, from 0.01 to 1.0 wt. %, preferably, from 0.4 to 0.98 wt. %, based on total solids in the dry mix, of an aluminum cement, such as calcium aluminate, a fatty acid or a fatty acid salt of an alkali metal, an alkaline earth metal or a divalent metal, preferably, sodium oleate, and metakaolin.

2. The metakaolin may be used in an amount of from 0.5 to 5.0 wt. %, based on total solids in the dry mix composition, preferably, from 0.5 to less than 1.0 wt. %.

3. The dry mix compositions of the present invention may comprise from 30 to 50 wt. % of the Portland cement.

4. The remainder of the composition may comprise sand or aggregate having an particle size of 0.08~0.6 mm, preferably, up to 0.4 mm.

5. One or more filler, such as calcium carbonate or talc may be included in the dry mix composition.

6. In another aspect, the present invention comprises the use of the dry mix compositions in accordance with any one of items 1 to 5, above, as a tile grout.

7. In accordance with another aspect of the present invention, methods of using the low efflorescence tile grout dry mix compositions comprise combining the dry mix compositions of any one of items 1 to 5, above, with water, allowing the mixture to sit to achieve a trowelable consistency, applying the trowelable mixture to gaps between two or more or a plurality of tiles that are adhered to a tile bearing substrate and drying.

8. The methods can comprise applying the trowelable compositions with a plastic trowel, squeegee or stiff closed cell rubber foam pad.

As used herein, the term "CH" is the abbreviation of $Ca(OH)2$ which is formed during cement hydration; the term "C2ASH8" is the abbreviation of gehlenite hydrate, $2CaO.Al2O3.SiO2.8H2O$; and the term "CSH" is the abbreviation of calcium silicate hydrate, $CaO.SiO2.H2O$.

As used herein, the term "total solids" means the weight of materials in the dry mix compositions of the present invention and does not include water, solvents and wet additives.

As used herein, the term "wt. %" stands for weight percent.

All ranges recited are inclusive and combinable. For example, a disclosed proportion of 0.01 to 1.0 wt. %, or, from 0.4 to 0.98 wt. %, based on total solids in the dry mix, would include a range of from 0.01 to 1.0 wt. %, from 0.01 to 0.4 wt. %, from 0.01 to 0.98 wt. %, from 0.4 to 0.98 wt. %, from 0.4 to 1.0 wt. % and from 0.98 to 1.0 wt. %.

Unless otherwise indicated, all temperature and pressure units are room temperature and standard pressure.

Unless otherwise stated, the term "EN" stands for European Norm and designates a test method as a prefix to the test method number. European Norm is a standard published by the European Technical Committee for Standardization CEN/TC 67 'Ceramic tiles', Brussels, Belgium. Unless otherwise stated, the test method is the most current test method as of the priority date of this document.

All phrases comprising parentheses denote either or both of the included parenthetical matter and its absence.

The present inventors have found that aluminum cement when used in small amounts (<1.0 wt. % of total solids) accelerates the hydration of Portland cement especially at a low temperature at or below 20° C., to help tile grout harden quickly while maintaining the workable or open time. The quick strength development decreases efflorescence especially in winter because it accelerates the formation of a compacted mortar structure, shortening the time calcium ions have to migrate into water, and preventing the migration of water to the grout surface.

The high reactivity metakaolin reacts with $Ca(OH)2$ through a pozzolanic reaction and forms gehlenite hydrate (C2ASH8) and calcium silicate hydrate (CSH). High reactivity metakaolin is lime hungry material that can effectively react with $Ca(OH)_2$, thereby decreasing the formation of $CaCO_3$ and thus efflorescence. A suitable metakaolin may be any powder having a median particle diameter (D50) of <4.5 um as determined by laser light scattering. and a total aluminosilicate $(SiO_2+Al_2O_3)$ content of ≥90%. Suitable amounts of the metakaolin may range from 0.5 to 5 wt. %, based on total solids in the dry mix or, preferably, from 0.5 to less than 1.0 wt. %.

The aluminum cement of the present invention may be any fine particle cement comprising 40 wt. % or more, based on aluminum cement solids, of alumina (Al2O3), preferably, 50.0 wt. % or more, and as much as 80 wt. %, such as from 50 to 80 wt. %, based on the total aluminum cement solids. Suitable particle sizes may range as low as a specific surface area blaine 370 m2/kg (Determined according to EN 196-6: Methods of testing cement-Determination of fineness, 30 Apr. 2010). The amount of aluminum cement used in the tile grout dry mix compositions ranges from 0.3 to 1.0 wt. %, preferably, from 0.5 to 0.9 wt. %, based on total solids in the dry mix. Use of too little of the aluminum cement will impair setting in use.

The fatty acid or a fatty acid salt of an alkali metal, an alkaline earth metal or a divalent metal of the present invention acts as hydrophobic agent to decrease water absorption, prevent water penetrating into grout and thus decrease efflorescence. Suitable fatty acids include oleic acid or alkali metal, alkaline earth metal or divalent metal fatty acid salts include sodium oleate, calcium oleate, sodium cocoate and zinc stearate. Suitable materials may be used in the form of fine grade powders that have particle sizes similar to or less than those of the aggregate of the present invention. Such powders may be sprayed on a carrier like silica or calcium carbonate which is otherwise suitable as a filler in the compositions of the present invention. Suitable amounts of the fatty acid or a fatty acid salt of an alkali metal, an alkaline earth metal or a divalent metal to produce a hydrophobic effect may range from 0.25 to 0.75 wt. %, based on total solids in the dry mix, preferably, from 0.3 to 0.55 wt. %.

Any conventional Portland cement may be suitable for use in the present invention and may be selected from the group consisting of Portland cement, Portland-slag cement, Portland-silica fume cement, Portland-burnt shale cement, and combinations thereof. Preferably, the cement is ordinary Portland cement. In preferred embodiments, the compositions comprise Portland cement in an amount ranging from 30 to 50 wt. %, based on total solids of the dry mix, preferably, 40 wt. % or less. Use of too little Portland cement will interfere with the strength of the cured product. Use of too much Portland cement will cause undue shrinkage of the tile grout in use.

Any sand or aggregate having particle size range of 0.08-0.6 mm, preferably up to 0.4 mm, may be used in the present invention. Suitable sand or aggregate materials may include, for example, silica sand, dolomite, and limestone. Too large a particle size will impair the smoothness of the finish made by the tile grout composition. Sand or aggregate can be used in amounts of up to 58.9 wt. %, based on total solids in the dry mix.

Suitable fillers are any inert inorganic material having an average particle size of 150 µm or less, preferably, 100 µm. Calcium carbonate, talc, wollastonite, mica, dolomite powder and clay may be used as fillers in amounts of up to 15 wt. %, based on total solids, preferably, 10 wt. % or less, or 5 wt. % or more.

To enhance setting strength and improve water impermeability, the tile grout may comprise up to 5 wt. % of one or more redispersible polymer powders (RDP), based on the total solids in the dry mix compositions, preferably, up to 2 wt. %. A variety of conventional RDPs available from commercial sources may be used, such as, for example, acrylic polymer, vinyl acetate homopolymer, vinyl acetate-ethylene copolymer, styrene-butadiene copolymer or mixtures thereof.

In addition, the tile grout compositions of the present invention may comprise one or more conventional additives such as pigments or dyes, organic or inorganic thickening agents, such as cellulose ethers, redispersible polymer powders (RDP), secondary water retention agents, anti-sag agents, wetting agents, defoamers, superplasticizers, dispersants, calcium complexing agents, accelerators, and water repellents, all of which are well known in the art and are available from commercial sources. However, use of such materials can add appreciably to the cost of using the tile grouts of the present invention.

Any cellulose ether having a viscosity of less than 8,000 mPa·s as a 2 wt. % solution in water (Brookfield DV-III Ultra Rheometer, spindle #6 at speed 20 rpm, 20° C., Brookfield Engineering Laboratories, Inc., Middleboro, Mass.), preferably, 6,500 mPa·s or less, or 2,000 mPa·s or more, may be suitable for use in the present invention. In such compounds, the hydroxyl groups present in cellulose may be partially or fully replaced by —OR groups, wherein R is selected from a $(C_1-C_6)$ alkyl group, a hydroxyalkyl $(C_1-C_6)$alkyl group and mixtures thereof. Suitable water soluble cellulose ethers may be alkylhydroxyalkylcelluloses, hydroxyalkyl celluloses, alkyl celluloses, or a mixture of such cellulose ethers. Examples of cellulose ether compounds suitable for use in the present invention include, for example, methylcellulose (MC), methylhydroxyethylcellulose (MHEC), methylhydroxypropylcellulose (MHPC), hydroxyethylcellulose (HEC), ethylhydroxyethylcellulose (EHEC), methylethylhydroxyethylcellulose (MEHEC), hydrophobically modified ethylhydroxyethylcelluloses (HMEHEC), hydrophobically modified hydroxyethylcelluloses (HMHEC), sulfoethyl methylhydroxyethylcelluloses (SEMHEC), sulfoethyl methylhydroxypropylcelluloses (SEMHPC), and sulfoethyl hydroxyethylcelluloses (SEHEC). Any of these compounds may be used in amounts of up to 0.1 wt. %, based on the total solids in the dry mix, preferably, from 0.01 to 0.07 wt. %.

The following examples illustrate the present invention. Unless otherwise indicated, all parts and percentages are by weight and all temperatures are in degrees centigrade (° C.). Unless otherwise indicated, all temperatures are room temperature (23±2° C.) and all standard relative humidity are (50±5%). Abbreviations used in the Examples and Tables are listed alongside their corresponding descriptions:

EXAMPLES

As indicated in Table 1, below, the following materials were used:

TABLE 1

Formulation Materials

| Material | Description |
|---|---|
| Portland cement | P.W. 42.5[1] |
| Aluminum cement | Ternal ™ white (Al2O3% >68.5 dry wt. %)[2] |
| River sand | <0.4 mm |
| Calcium carbonate[3] | 135 µm (100 mesh) |
| Sodium oleate | LIGA ™ Natriumoleat 90[4] |
| Metakaolin | PowerPozz ™,[5] $Al_2O_3 \cdot 2SiO_2$ |
| Anti efflorescence additive | ERA200 ™, [6] Terpenoid, resin acid, colophony, terpene resin, terpene-phenol resins |
| Hydrophobic additive | Seal80 ™, [6] Alkoxy alkyl silane |
| Cellulose ether | 55RT6000[7] Hydroxypropyl methyl cellulose, viscosity: 4000~6000 mPa · s (2% solution, Brookfield DV-III Ultra, spindle #6 at speed 20 rpm, 20 °C.) |
| Redispersible powder | 8031H[8] Ethylene/vinyl laurate/vinyl chloride |
| Calcium formate[9] (accelerator) | $Ca(HCOO)_2$ |

[1]Shanghai White Cement Company (Shanghai, CN);
[2]Kerneos (China) Aluminum Technology Co., Ltd. (Tianjing, CN);
[3]Zhejiang XingMinghua building material Co., Ltd. (Zhejiang, CN);
[4]Peter Greven Fett Chemie GmbH & Co. (Bad Münstereifel, DE);
[5]Shanghai TianCe Trading Co., Ltd. (Shanghai, CN);
[6] Elotex AG (Shanghai, CN);
[7]ShanDong Ruitai Co., Ltd. (Shandong, CN);
[8]Wacker Chemical (China) Co., Ltd. (Shanghai, CN);
[9]Lanxess (Shanghai) Trading Co., Ltd. (Shanghai, CN).

The following experimental test methods were used:

Dry Mix Preparation:

The cement, sand, and other materials used were each weighed and placed into a plastic bag which is then hand mixed for 2 minutes and allowed to sit at room temperature and standard humidity for 24 hrs to form a dry mix tile grout.

Fresh Tile Grout Preparation:

The dry mix tile grout is mixed with water in mixer for 2 min, water dosage is determined so as to give a desired consistency of 6-8 mm.

Consistency Test:

Consistency is tested with mortar consistency tester (Type SC-145, Zhejiang, China)) according to Chinese standard JGJ/T 70-2009 "Standard for test method of performance on building mortar" (Published by the Ministry of Construction of China, Beijing, Jun. 1, 2009). The consistency was tested with a cone made of stainless steel or copper, the weight is (300±2)g. The cone is mounted on a vertical slide bar that is itself fastened by a screw to a horizontal bar mounted on a laboratory stand or bracket. To test, mortar was filled into a container until the surface of mortar was 10 mm below the rim of the container and then the mortar was tamped 25 times with a round steel bar (10 mm diameter, 350 mm length) and knock the container 5-6 times to flatten the mortar surface. Then the container was put on a base mounted below the cone and the cone was moved until its tip contacted the surface of mortar. The screw was then loosened to let the cone fall into the mortar for 10 s, and the distance the cone falls into the mortar was measured and recorded in mm.

Efflorescence Test:

Apply the fresh tile grout on an expanded polystyrene slab to a thickness of (5±1)mm, and put the sample immediately into a curing room at (23±2° C. and (50±5)% humidity for 2 hours. Then put the sample into the refrigerator at 5° C. and 90% humidity inside, mist water onto the sample until its surface is covered with water. After 24 hours put the sample back into the curing room for 24 h, then score the efflorescence the appears on the surface of the tile grout from 1 to 5, as follows:

1 means very slight efflorescence, 5 means very strong efflorescence. Efflorescence with the score less than 2 is acceptable.

TABLE 2

Efflorescence Test Results (all % s are wt. %, based on total solids)

| Material | Example 1 | | Example 2* | | Example 3* | |
|---|---|---|---|---|---|---|
| Portland cemft | 34.500% | | 34.500% | | 35.000% | |
| Aluminum cement | 0.500% | | 0.500% | | — | |
| River sand | 52.440% | | 53.190% | | 51.32% | |
| Calcium carbonate (100 mesh) | 10.000% | | 10.000% | | 10.000% | |
| Sodium oleate | 0.300% | | — | | — | |
| Metakaolin | 0.800% | | — | | — | |
| Anti efflorescence additive | — | | 0.150% | | — | |
| Hydrophobic additive | — | | 0.200% | | — | |
| Cellulose ether | 0.080% | | 0.080% | | 0.080% | |
| Redispersible powder | — | | — | | 0.300% | |
| Calcium formate | — | | — | | 0.300% | |
| Pigment | 3.000% | | 3.000% | | 3.000% | |
| Water ratio/% | 21 | 24 | 20 | 23 | 20 | 23 |
| Consistency/cm | 6 | 8 | 6 | 8 | 6 | 8 |
| Efflorescence | 1.2 | 1.2 | 1.5 | 1.4 | 4 | 4 |
| Cost (RMB/t)[1] | 640 | | 860 | | 480 | |

*Indicates Comparative Example; Cost is based on prevailing retail market conditions in Shanghai as of the filing date of this disclosure.

The test results show the inventive formulation of Example 1 can decrease efflorescence significantly compared with a conventional tile grout formula of Example 3. In comparison to Example 2, comprising a combination of the same amount of aluminum cement as Example 1, along with ERA200™ resin and seal 80™ silane, the inventive formulation of Example 1 slightly improves efflorescence at two different water ratios but at a significantly lower formulation cost. This is so even using only 0.8% of metakaolin.

TABLE 3

Test Results Formulations Without Aluminum Cement.
Example 4*

| Material | Wt. % (based on total solids) |
|---|---|
| Portland cement | 35.000% |
| Aluminum cement | — |
| River sand | 51.32% |
| Calcium carbonate | 10.000% |
| Sodium oleate | 0.300% |
| Metakaolin | 0.800% |
| Cellulose ether | 0.080% |
| Pigment | 3.000% |
| Water ratio/% | 20 |
| Consistency/cm | 6 |
| Efflorescence | 2 |

*— Indicates Comparative Example

As shown in Table 3, above, Example 4 used as a tile grout exhibits much stronger efflorescence when compared with the inventive formula of Example 1 which contains aluminum cement. Accordingly, aluminum cement is necessary for reducing efflorescence at a low cost in accordance with the present invention.

TABLE 4

Test Result Of Formulations with Only Sodium Oleate.

| | Example | |
|---|---|---|
| Materials | 5* Wt. % (based on total solids) | 6* Wt. % (based on total solids) |
| Portland cement | 34.500% | 34.500% |
| Aluminum cement | — | — |
| <River sand | 52.440% | 53.190% |
| Calcium carbonate | 10.000% | 10.000% |
| Sodium oleate | 0.300% | 0.500% |
| Metakaolin | — | — |
| Cellulose ether | 0.080% | 0.080% |
| Pigment | 3.000% | 3.000% |
| Water ratio/% | 20 | 21 |
| Consistency/cm | 6 | 6 |
| Efflorescence | 2.5 | 2.5 |

*— Indicates Comparative Example

As shown in Table 4, above, Examples 5 and 6 with sodium oleate and no aluminum cement or metakaolin have more than twice the efflorescence compared with inventive Example 1. The lower efflorescence level compared with comparative Example 3, in Table 1, above, shows that sodium oleate is effective for reducing efflorescence.

TABLE 5

Effect of Various Hydrophobia Agents
(%s are all wt. %, based on total solids)

| Materials | Example 7* | Example 8* |
|---|---|---|
| Portland cement | 34.500% | 35.000% |
| River sand | 52.440% | 51.32% |
| Calcium carbonate | 10.000% | 10.000% |
| Sodium oleate | 0.300% | — |
| Zinc stearate | — | 0.300% |
| Cellulose ether | 0.080% | 0.080% |
| Pigment | 3.000% | 3.000% |
| Water ratio/% | 20 | 21 |
| Consistency/cm | 6 | 6 |
| Efflorescence | 2.5 | 3 |

*— Indicates Comparative Example

As shown in Table 5, above, the test results show that sodium oleate in Example 7 and zinc stearate in Example 8 have a similar effect to reduce efflorescence. Zinc stearate is thus effective in the present invention.

TABLE 6

Effect of Concentration
(%s are all wt. %, based on total solids)

| Materials | Example 9 |
|---|---|
| Portland cement | 34.500% |
| Aluminum cement | 1.000% |
| <0.4 mm sand | 46.920% |
| Calcium carbonate | 10.000% |
| Sodium oleate | 0.500% |

TABLE 6-continued

Effect of Concentration
(%s are all wt. %, based on total solids)

| Materials | Example 9 |
|---|---|
| Metakaolin | 4.000% |
| 55RT6000 | 0.080% |
| Pigment | 3.000% |
| Water ratio/% | 23 |
| Consistency/cm | 6 |
| Efflorescence | 1.0 |

As shown in Table 6, above, the test results show that Example 9 with more aluminum cement, sodium oleate and metakaolin reduces efflorescence even more effectively than in Example 1 even with only 1 wt. %, based on total dry mix weight, of Aluminum cement.

We claim:

1. A low efflorescence tile grout composition comprising a dry mix of a) Portland cement, b) sand or aggregate, c) from 0.01 to 1.0 wt. %, based on total solids in the dry mix, of an aluminum cement, d) a fatty acid or a fatty acid salt of an alkali metal, an alkaline earth metal or a divalent metal, and e) metakaolin.

2. The dry mix composition as claimed in claim 1, wherein the amount of aluminum cement c) ranges from 0.4 to 0.98 wt. %, based on total solids in the dry mix composition.

3. The dry mix composition as claimed in claim 1, wherein the amount of metakaolin e) ranges from 0.5 to 5.0 wt. %, based on total solids in the dry mix composition.

4. The dry mix composition as claimed in claim 3, wherein the amount of metakaolin e) ranges from 0.5 to less than 1.0 wt. %.

5. The dry mix composition as claimed in claim 1, comprising from 30 to 50 wt. % of the Portland cement a).

6. The dry mix composition as claimed in claim 5, further comprising one or more filler.

7. The dry mix composition as claimed in claim 1, wherein the sand or aggregate b) has particle size range of 0.08-0.6 mm.

8. The dry mix composition as claimed in claim 1, wherein the fatty acid or fatty acid salt of an alkali metal, alkaline earth metal or a divalent metal d) comprises sodium oleate.

9. Use of the dry mix compositions as claimed in any one of claims 1 to 8 as a tile grout.

10. In a method of using a low efflorescence tile grout dry mix composition wherein two or more or a plurality of tiles are laid on and adhered to a substrate with their largest dimension lying on the substrate, and then a tile grout is applied in the spaces or gaps between the thus laid tiles, the improvement comprising combining the dry mix compositions of any one of claims 1 to 8 with water to form a mixture, allowing the mixture to sit to achieve a trowelable consistency, applying the trowelable mixture to the gaps between the two or more or the plurality of tiles that are adhered to the tile bearing substrate and drying.

\* \* \* \* \*